Feb. 10, 1970
B. E. ENSSLE
3,494,590
BALL VALVE WITH SINGLE INTEGRAL MEMBER
COMPRISING BALL, STEM, AND HANDLE
Filed March 11, 1968
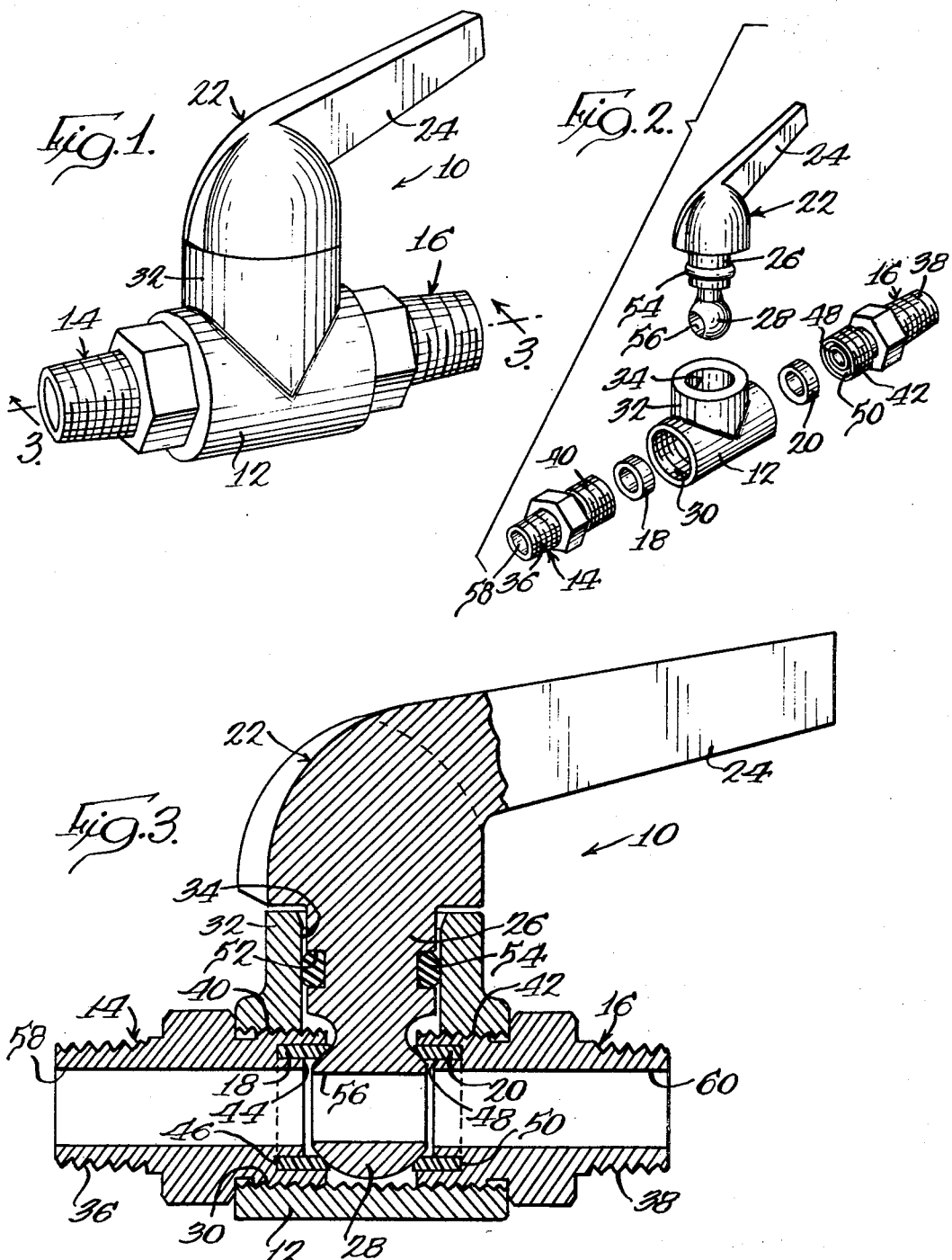
Inventor:
Bruno E. Enssle
By Gary Parker,
Juettner, Pigott & Cullinan
Att'ys

United States Patent Office 3,494,590
Patented Feb. 10, 1970

3,494,590
BALL VALVE WITH SINGLE INTEGRAL MEMBER COMPRISING BALL, STEM, AND HANDLE
Bruno E. Enssle, Boulder, Colo., assignor, by mesne assignments, to Binks Research and Development Corporation, Boulder, Colo., a corporation of Colorado
Filed Mar. 11, 1968, Ser. No. 712,171
Int. Cl. F16k 5/06, 31/60, 21/08
U.S. Cl. 251—315          5 Claims

ABSTRACT OF THE DISCLOSURE

An improved ball valve having a handle portion, a stem and a valve ball which comprise a single integral component, and embodying improved means for mounting the handle, stem and ball member relative to a valve body.

BRIEF SUMMARY OF THE INVENTION

The present invention relates to a ball valve for controlling the flow of gases and liquids. It is conventional in the art to provide a ball valve having a body portion and a handle member with a stem fixed relative to the handle at one end, the other end of the stem being fixedly connected to a valve ball for conjoint rotation therewith whereupon rotation of the handle member will effect rotation of the valve ball between its open and closed positions.

The present invention is an improvement over the ball valve described in my copending application Ser. No. 470,517, filed July 8, 1965, now Patent No. 3,448,961. Relative to the valve described in the latter application, there is a stem member which is press fitted into a handle at one end and which is provided with a tongue at its other end which fits into a slot formed on one side of the ball so as to interconnect the stem and ball with the handle for conjoint rotation therewith.

Referring further to the valve described in the foregoing copending application, the stem member fits rather closely relative to a bore in the valve body through which the stem extends whereby in effect the valve body acts as a bearing for supporting the stem thus controlling the orientation of the stem and the ball connected therewith. On the other hand, in accordance with the present invention a bore provided for the stem in the valve body is significantly larger in diameter than the diameter of the stem so as to permit a certain freedom of movement of the stem, and a pair of fittings including seal members which engage against opposite sides of the ball serve as the principal supporting means for the ball and the integral stem and handle members.

It is therefore a general object of the present invention to provide an improved ball valve having a handle member, a stem member and a ball member formed as one integral part and supported primarily by oppositely disposed fittings having seals therein which sealingly engage against opposite sides of the ball.

The foregoing and other objects and advantages of the invention will be apparent from the following description of a preferred embodiment thereof, taken in conjunction with the accompanying drawings.

DESCRIPTION OF THE DRAWINGS

FIGURE 1 is a perspective view of a valve assembly constructed in accordance with the present invention;

FIGURE 2 is an exploded view of the valve assembly of FIGURE 1; and

FIGURE 3 is an enlarged vertical sectional view taken substantially along the line 3—3 of FIGURE 1.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Referring now to the drawings, there is shown a valve assembly 10 comprising a valve body 12, a pair of end fittings 14 and 16, a pair of tubular seals 18 and 20, and a handle member indicated generally at 22 which includes a handle portion 24, a stem 26 and a ball 28, the handle, the stem and the ball being formed as the single integral part 22. The valve body 12 is provided with a longitudinal threaded bore 30 which comprises a fluid passage through the valve, and a boss 32 extends radially from the longitudinal passage 30 and has formed therein a bore 34 which communicates with the passage 30.

Removably threaded in the opposite ends of the passage 30 are the two fittings 14 and 16. Such fittings may be made interchangeable to provide, on order or to satisfy various field conditions, straight or tapered male or female fittings of a variety of sizes as may be required at each end of the valve body 12. Thus, while tapered male threads 36 and 38 have been shown in the drawing as formed on the outer ends of the fittings 14 and 16, it will be understood that such outer ends may take other forms as desired. Regardless of the outer threaded portions 36 and 38, the two fittings include threaded male inner end portions 40 and 42, preferably of straight thread configuration.

At the inner end of the fitting 14 there is provided a counterbore 44, and there is further provided an annular recess 46 concentric with and communicating with the counterbore. The tubular sealing member 18 is removably inserted into the annular recess 46, and by virtue of the fact that the sealing element is encased and retained in the recess 46 it is fully reinforced against cold flow and/or excessive deformation and thus has imparted to it a long and useful service life. In particular, the outer peripheral surface of the seal 18 is substantially fully supported by the outer wall of the recess 46 and counterbore 44, and the majority of the inner peripheral surface is supported by the inner wall of the recess.

Thus, the confined volume of the seal substantially exceeds the free or unconfined volume of the seal, and this is especially desirable with fluorohydrocarbon seal materials. The confined volume is maintained sufficiently high to sustain stresses without exceeding the modulus of elasticity of the seal material, but not so high as to suffer excessive stress dissipation or excessively slow elastic return. In the illustrated embodiment of my valve, utilizing polytetrafluoroethylene seals, the ratio of the confined volume to the free volume of each seal is preferably about three to one. While I have described the fitting 14 and seal 18, it will be understood that the seal 20 is similarly mounted in the inner end of the fitting 16 by means of a counterbore 48 and annular recess 50 formed in the latter fitting.

When assembled as shown in FIGURE 3 the valve stem 26 extends down through the bore 34 in the boss 32, while the valve ball 28 is disposed in the longitudinal passage 30 of the valve body 12 in between the inner ends of the two fittings 14 and 16. The stem 26 is provided with a circumferential groove 52 in which an O-ring seal 54 is mounted for sealing engagement with the inner diameter of the bore 34. However, it is important to note that the diameter of the bore 34 is significantly larger than the outer diameter of the stem 26 so as to provide a definite clearance therebetween sufficient to permit transverse movement of the stem relative to the bore 34 prior to the tightening of the fittings 14 and 16.

When the fittings 14 and 16 are threaded into their operative positions the two tubular seals 18 and 20 clamp the ball member 28 therebetween so as to confine the ball and sealingly engage opposite sides thereof while permitting rotational movement of the ball substantially about the longitudinal axis of the stem 26. The ball 28 is provided with the usual bore 56 to define a fluid passage therethrough, and it will be seen that when in the open position shown in FIGURE 3 the passage 56 in the ball is aligned with passages 58 and 60 in the fittings 14 and 16 so as to provide an unobstructed fluid passageway. It will of course be understood that when the handle 24 is rotated 90 degrees from the position shown, the ball 28 will be rotated 90 degrees to its closed position with the two tubular seals 18 and 20 sealingly engaged against the opposite solid sides of the ball.

The ball valve 10 of the present invention represents a significant improvement over conventional ball valves with respect to the integral construction of the handle, stem and valve ball members and the manner of supporting the same. It will be noted from FIGURE 3 that the stem 26 in effect floats within the bore 34 with only the O-ring 54 in engagement with the wall of the bore, and thus the integral member 22 comprising the handle 24, stem 26 and ball 28 is supported substantially by the tubular seal members 18 and 20 which are compressed against opposite sides of the valve ball 28 thus insuring maximum sealing efficiency.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. An improved ball valve comprising, in combination, a valve body having a longitudinal fluid passage extending therethrough and a transverse opening formed in one side thereof which communicates with said fluid passage, a valve ball, a valve handle, a valve stem, said ball, handle and a stem being formed as a single integral member, said integral member being disposed with said stem projecting into said valve body through said transverse opening with said valve ball located within said fluid passage, and a pair of end fittings mounted in opposite ends of said fluid passage, said end fittings each having a seal at the inner end thereof and being operatively positioned with the two seals pressed against opposite sides of said valve ball in sealing engagement therewith so as to firmly support said integral member while permitting rotation thereof about the axis of said stem.

2. The invention of claim 1 where said valve body is provided with internal threads at the two ends of said fluid passage and said two end fittings are threaded into the ends of said fluid passage to bring said seals into firm sealing engagement with said valve ball.

3. The invention of claim 1 where the diameter of said transverse opening exceeds the diameter of said valve stem so as to afford a definite clearance therebetween whereby the support for said integral handle, stem and ball member is provided largely by engagement with the seals of said end fittings.

4. The invention of claim 3 where said valve stem is formed with a circumferential groove in which is disposed an O-ring member which engages against the wall of said transverse opening.

5. An improved ball valve comprising, in combination, a valve body having a longitudinal fluid passage extending therethrough and a transverse opening formed in one side thereof which communicates with said fluid passage said valve body being provided with internal threads at the two ends of said fluid passage, a valve ball, a valve handle, a valve stem, said ball, handle and stem being formed as a single integral member, said integral member being disposed with said stem projecting into said valve body through said transverse opening with said valve ball located within said fluid passage, the diameter of said transverse opening being larger than the diameter of said valve stem so as to afford a definite clearance therebetween, a circumferential groove formed in said valve stem in which is disposed an O-ring member which engages against the wall of said transverse opening, and a pair of end fittings threaded into the opposite ends of the fluid passage in said valve body, said end fittings each having a generally tubular seal at the inner end thereof and being operatively positioned with the two seals pressed against opposite sides of said valve ball in sealing engagement therewith whereby the support for said integral handle, stem and ball member is provided largely by engagement with the seals of said end fittings which firmly support said integral member while permitting rotation thereof about the axis of said stem.

References Cited

UNITED STATES PATENTS

| 3,049,868 | 8/1962 | Adams et al. | 251—315 X |
| 3,132,836 | 5/1964 | Dickerson et al. | 251—315 X |
| 3,192,943 | 7/1965 | Moen | 251—288 X |
| 3,412,939 | 11/1968 | Shaffer | 251—315 X |

ARNOLD ROSENTHAL, Primary Examiner

U.S. Cl. X.R.

251—367